(12) United States Patent
Adler

(10) Patent No.: US 7,068,663 B1
(45) Date of Patent: Jun. 27, 2006

(54) PATH ROUTING AND PROVISIONING METHOD AND APPARATUS

(75) Inventor: John C. Adler, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 747 days.

(21) Appl. No.: 09/768,117

(22) Filed: Jan. 23, 2001

(51) Int. Cl.
*H04L 12/28* (2006.01)

(52) U.S. Cl. .................. 370/395.51; 370/392

(58) Field of Classification Search ............. 370/539, 370/393, 217, 227, 225, 218, 242, 352, 254, 370/390, 389, 374, 472, 503, 514, 228, 392, 370/465, 469, 506, 351, 395.2, 395.3, 395.31, 370/395.51, 395.53, 397, 401, 353, 386, 370/295.2; 709/224, 230, 231; 389/3, 59, 389/58, 71, 79, 82
See application file for complete search history.

(56) References Cited

U.S. PATENT DOCUMENTS

| | | | | |
|---|---|---|---|---|
| 5,206,858 A | * | 4/1993 | Nakano et al. | 370/465 |
| 5,335,223 A | * | 8/1994 | Iino | 370/503 |
| 5,568,486 A | * | 10/1996 | Huscroft et al. | 370/395.2 |
| 5,586,112 A | * | 12/1996 | Tabata | 370/225 |
| 5,841,760 A | * | 11/1998 | Martin et al. | 370/242 |
| 6,122,281 A | * | 9/2000 | Donovan et al. | 370/401 |
| 6,301,254 B1 | * | 10/2001 | Chan et al. | 370/397 |
| 6,654,802 B1 | * | 11/2003 | Oliva et al. | 709/224 |
| 2001/0029546 A1 | * | 10/2001 | Motoyama | 709/235 |
| 2002/0009048 A1 | * | 1/2002 | Hosler et al. | 709/217 |
| 2003/0058804 A1 | * | 3/2003 | Saleh et al. | 370/254 |
| 2003/0058865 A1 | * | 3/2003 | Mesh et al. | 370/393 |

OTHER PUBLICATIONS

Jay Hosler and Peter Lothberg, *Reflector Communications Channel for Automatic Protection Switching*, filed Mar. 27, 2000, US App. No. 09/537,439.

* cited by examiner

*Primary Examiner*—Phirin Sam
(74) *Attorney, Agent, or Firm*—Campbell Stephenson Ascolese LLP

(57) ABSTRACT

An apparatus, method and computer program product for a data communications system includes transmitting data in a transport overhead field to at least one network element, the data providing a source identifier and a destination identifier, and using the data in the transport overhead field to provide end-to-end service. One embodiment includes applying a routing protocol to read the source identifier and the destination identifier to provide routing, provisioning and restoration of functions. The transport overhead field is a J1 field in a SONET communication packet according to an embodiment. The J1 field includes the source identifier and the destination identifier and provides data for the end-to-end, or path-level services. Further, the J1 field, according to an embodiment, includes additional data such as one or more of transport identification data (TID), Internet Protocol (IP) addresses, Common Language Location Information (CLLI) data, and requests for bandwidth. By including the source identifier and the destination identifier, the method avoids manual point-by-point routing of STS-Ns. Another embodiment is directed applying a wavelength routing protocol to the data in the transport overhead field to provide end-to-end services, the wavelength protocol locating new paths for communication. According to this embodiment, an intelligent routing software system in combination with the wavelength routing protocol determines end-to-end routing automatically. Alternatively, the wavelength protocol locates new paths for communication via a user interface.

56 Claims, 6 Drawing Sheets

PATH ROUTING AND PROVISIONING METHOD AND APPARATUS

BACKGROUND OF THE INVENTION

1. Field of the Invention

The present invention relates to data communications, and, more particularly, to efficiency in provisioning, routing and restoration of data communication.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is one among those protocols designed to employ an optical infrastructure and is widely employed in voice and data communications networks. SONET is a physical transmission vehicle capable of transmission speeds in the multi-gigabit range, and is defined by a set of electrical as well as optical standards. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

In some networks, network nodes store data which they use for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995), hereinafter referred to as "SONET Specification," and incorporated herein by reference for all purposes.

SONET network equipment transmits the STS frames in various paths termed Line, Section, and Path. Referring to FIG. 1, SONET equipment is shown as depicting Section, Line and Path definitions. Path Terminating Equipment 10 is shown coupled to Line Terminating Equipment 20. Line Terminating Equipment 20 is coupled to Section Terminating Equipment 30. In general, the network equipment shown in FIG. 1 includes fiber optic equipment that interfaces with other types of transmission equipment.

When transported, the signals are broken into layers: physical, section, line and path. The layers are hierarchical in nature, with each layer performing a different function. The physical layer addresses the transport of bits across the physical medium. Accordingly, no overhead is associated with the physical layer. The equipment associated with the physical layer converts STS-N signals into optical or electrical SONET signals. The section layer addresses the transport of STS-N frames across the physical medium. The equipment associated with this layer functions to perform framing, scrambling, error monitoring and section-level overhead. Section terminating equipment 30 interprets, modifies and creates section overhead. The line layer addresses transport of path level payloads. The line layer further synchronizes and multiplexes functions for the path layer. Line layer overhead functions to maintain and protect. The overhead is interpreted, modified and created by line terminating equipment 20. The path layer addresses transporting payloads between SONET terminal multiplexing equipment. The path layer maps payloads into formats required by the line layer. The path layer communicates end-to-end with the path overhead with path terminating equipment 10. Generally, network equipment that contains path terminating equipment also contains section and line terminating equipment.

What is needed is a provisioning system and method that provides end-to-end provisioning. Newer routing protocols and delivery methods require data beyond network operations data for a network to function efficiently. Terminating equipment more and more requires access to routing type data.

SUMMARY OF THE INVENTION

Accordingly, an apparatus and method for a data communications system includes transmitting data in a transport overhead field to at least one network element, the data providing a source identifier and a destination identifier, and using the data in the transport overhead field to provide end-to-end service. One embodiment includes applying a routing protocol to read the source identifier and the destination identifier to provide routing, provisioning and restoration of functions.

According to an embodiment, the transport overhead field is a J1 field in a SONET communication packet. The J1 field includes the source identifier and the destination identifier and provides data for the end-to-end, or path-level services. Further, the J1 field, according to an embodiment, includes additional data such as one or more of transport identification data (TID), Internet Protocol (IP) addresses, Common Language Location Information (CLLI) data, and requests for bandwidth. By including the source identifier and the destination identifier, the method avoids manual point-by-point routing of STS-Ns.

Another embodiment is directed applying a wavelength routing protocol to the data in the transport overhead field to provide end-to-end services, the wavelength protocol locating new paths for communication. According to this embodiment, an intelligent routing software system in combination with the wavelength routing protocol determines end-to-end routing automatically. Alternatively, the wavelength protocol locates new paths for communication via a user interface.

Another embodiment of the invention is directed to a computer program product for communication, the computer program product including signal bearing media bearing programming adapted to transmit data in a transport overhead field to at least one network element, the data providing a source identifier and a destination identifier, and use the data in the transport overhead field to provide end-to-end services.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of this patent application will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention that is defined in the claims following the description.

Figure 1:
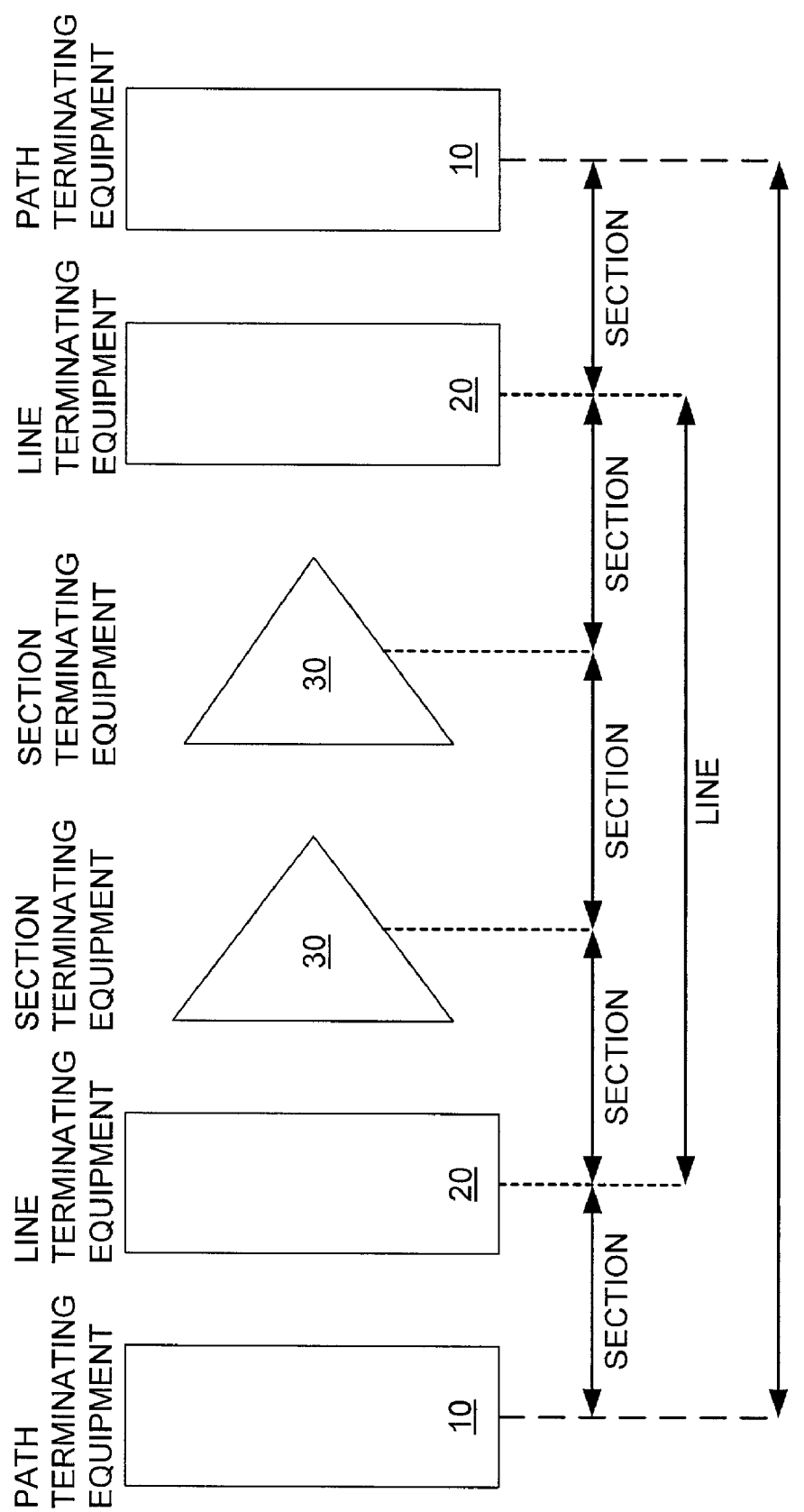
FIG. 1 is a block diagram of a network configuration in accordance with the SONET Specification.
Figure 2:
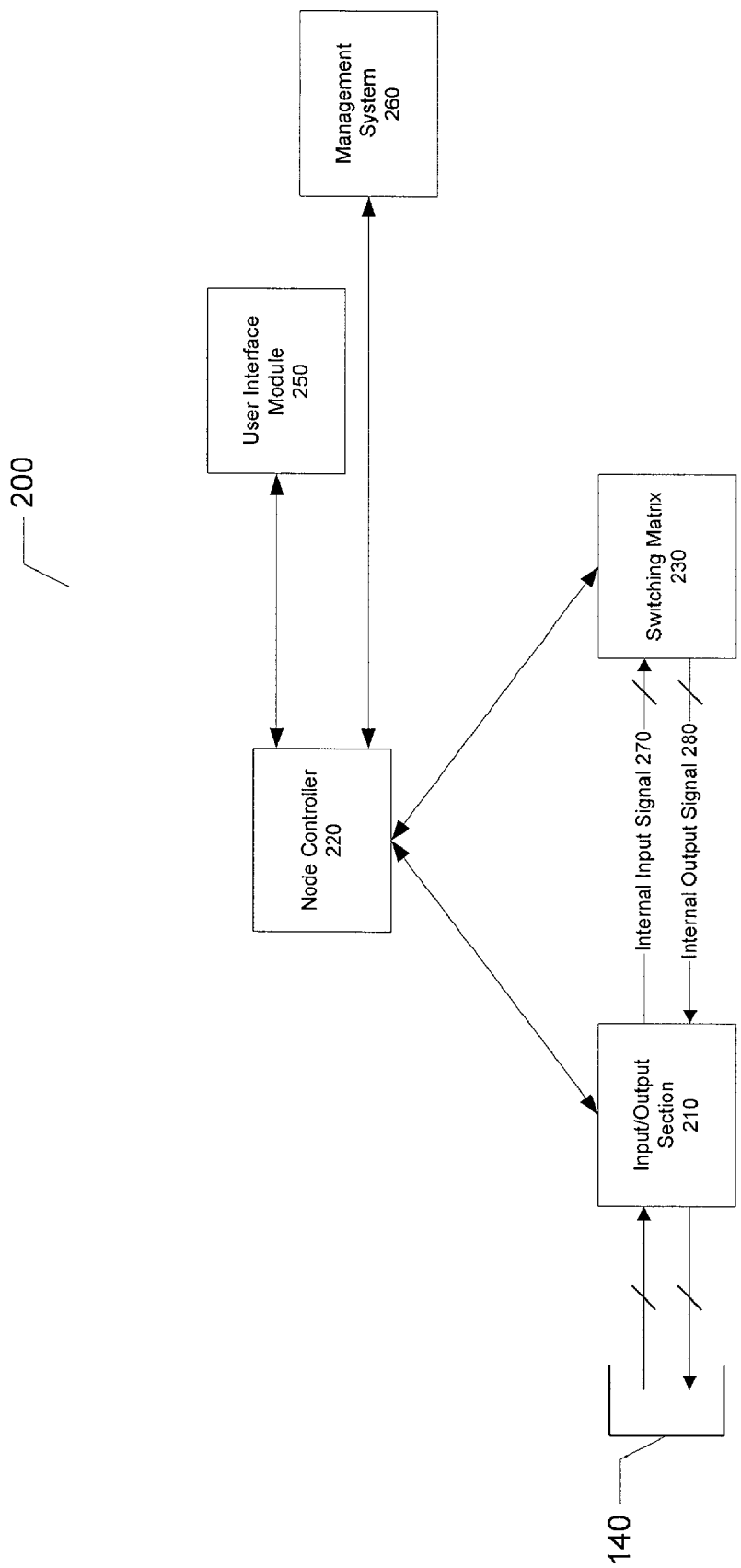
FIG. 2 is a block diagram of an exemplary router in a network configuration in accordance with an embodiment of the present invention.

FIG. 2 illustrates a router 200. Router 200 includes an input/output section 210, a node controller 220, and a switching matrix 230. Node controller 220 contains, for example, real time software and intelligent routing protocols (not shown). Router 200 supports interfaces including, but not limited to, optical signal interfaces (e.g., SONET), a user interface module 250, and a management system 260. Internal input signals 270 and internal output signals 280 may be electrical or optical in nature.

Figure 3:
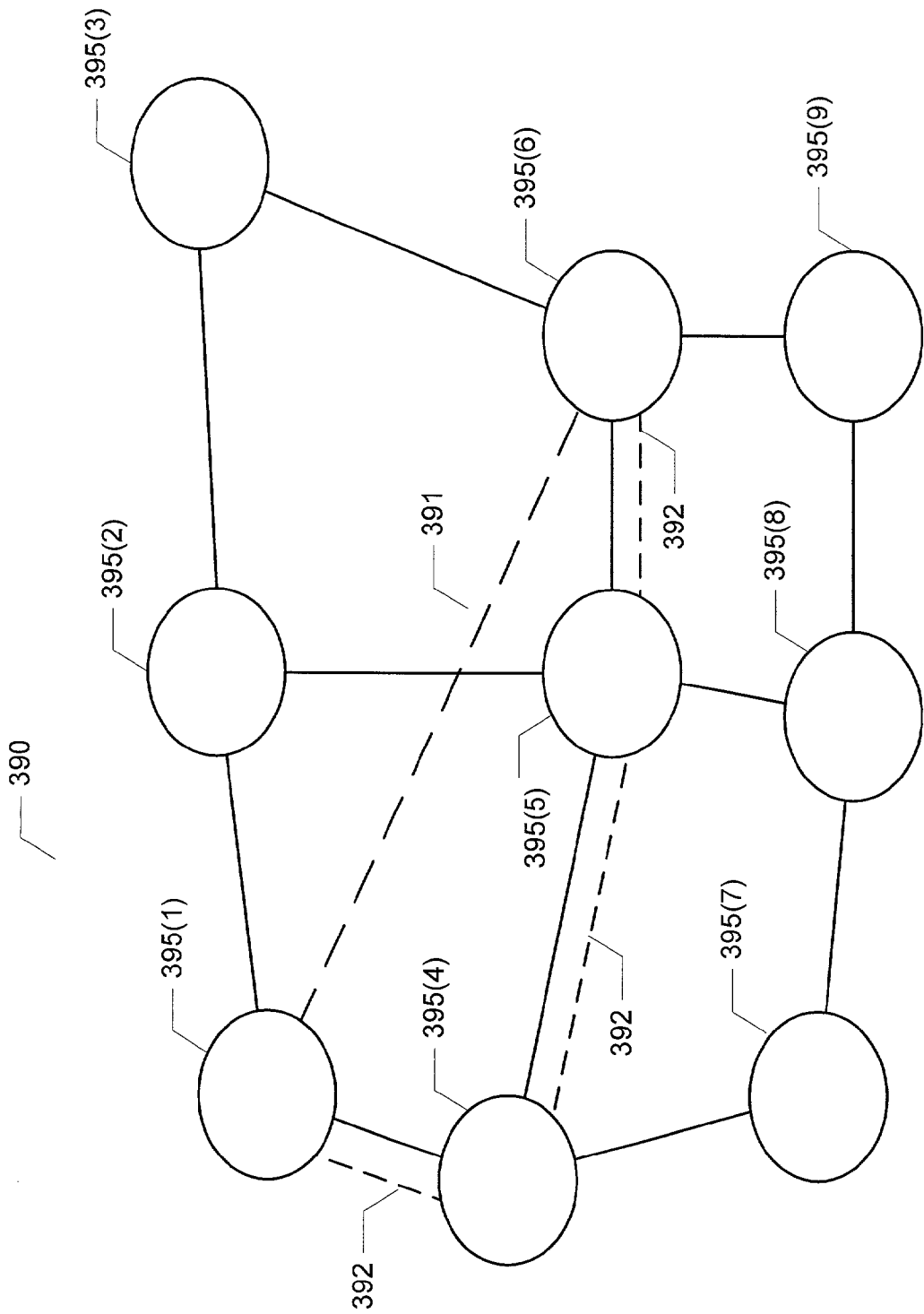
FIG. 3 is a block diagram of a network with a plurality of nodes in accordance with an embodiment of the present invention.

FIG. 3 illustrates a network 390 that includes a number of nodes, network nodes 395(1)–(N). One or more of network nodes 395(1)–(N) can be a router such as router 200. Network 390 can thus support provisioning, testing, restoration, and termination of virtual paths (exemplified by a virtual path 391) over a physical path (exemplified by a physical path 392) from one of network nodes 395(1)–(N) to another of network nodes 395(1)–(N).

In one embodiment, there are at least three types of processors in a router 200. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response times required from the level-3 processor make a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, i.e., level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the datapath. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are two fully synchronous copies of the level-1 processor in the system, both of which are simultaneously active and, through a dedicated and redundant high-speed link, keep their runtime and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 200 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

In one embodiment of the invention, router 200 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 4:
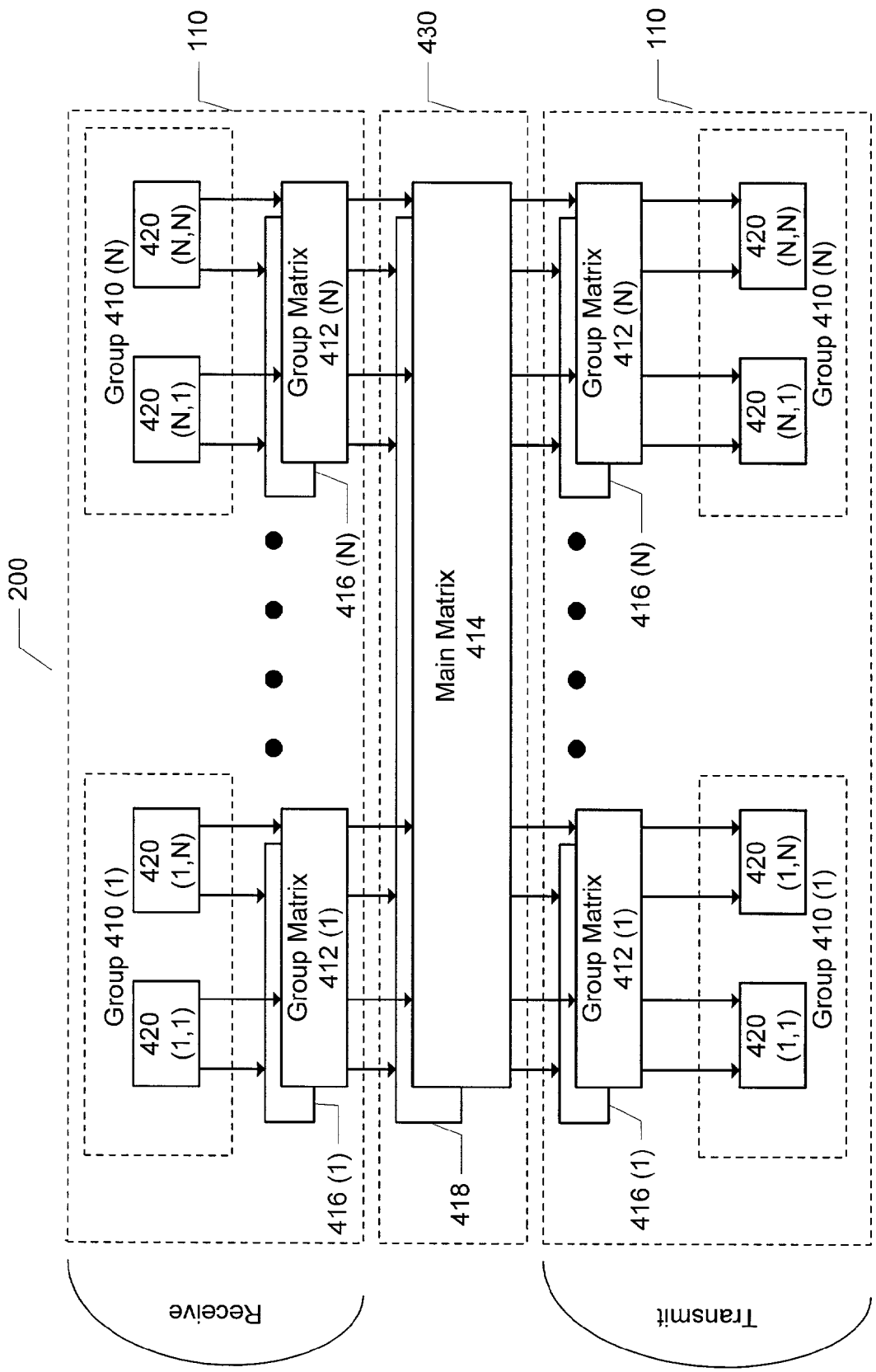
FIG. 4 is a block diagram of signal paths within a router in accordance with an embodiment of the present invention.

FIG. 4 is a block diagram of signal paths within router 200. The primary signal paths in router 200 include one or more groups exemplified by groups 410(1)–(N), group matrices 412(1)–(N), and a main matrix 414. Groups 410(1)–(N) and group matrices 412(1)–(N) are shown as having receive and transmit sections. Groups 410(1)–(N) each include line cards 420(1,1)–(1,N), through line cards 420(N,1)–(N,N). Signals from line cards 320(1,1)–(N,N) are sent to the corresponding group matrix. In one embodiment, two sets of the group matrix cards, group matrices 412(1)–(N) and 416(1)–(N) are employed. Main matrix 414 is also mirrored in one embodiment by a redundant copy, a backup main matrix 418, which together form switching matrix 430. As shown in FIG. 4, the redundancy for group matrices 412(1)–(N) (i.e., group matrices 416(1)–(N)), is also provided on the transmit side.

It will be noted that the variable identifier "N" is used in several instances in FIG. 4 to designate the final element (e.g., group matrix 412(N), line card 420(N,N), and so on) of a series of related or similar elements (e.g., group matrices 412(1)–(N), line cards 420(1,1)–(N,N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" may hold the same or a different value than other instances of the same variable identifier. For example, group matrix 412(N) may be the tenth group matrix in a series of group matrices, whereas line card 420(N,N) may be the forty-eighth line card in a series of line cards.

Using the signal paths shown in FIG. 4 as an example, data enters the system at one of line cards 420(1,1)–(N,N). It is at this point, in a SONET-based system, that the Section and Line overheads are processed and stripped off by a protocol processor, such as the protocol processor 520 shown in FIG. 5. The extracted SONET/SDH payload envelope is then synchronized with the system clock and sent to two different copies of a local matrix, depicted as group matrices 412(1)–(N) and 416(1)–(N) in FIG. 4. In one embodiment, group matrices 412(1)–(N) and 416(1)–(N) are used mainly as 2:1 reduction stages that select one of two optical signals and pass the selected optical signal to switching matrix 230 shown in FIG. 2. This allows the implementation of a variety of protection schemes (including 1:N, or 0:1) without having to use any additional ports on main matrix 214. All protect signals are terminated at group matrices 412(1)–(N) and 416(1)–(N).

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Line Card

Figure 5:
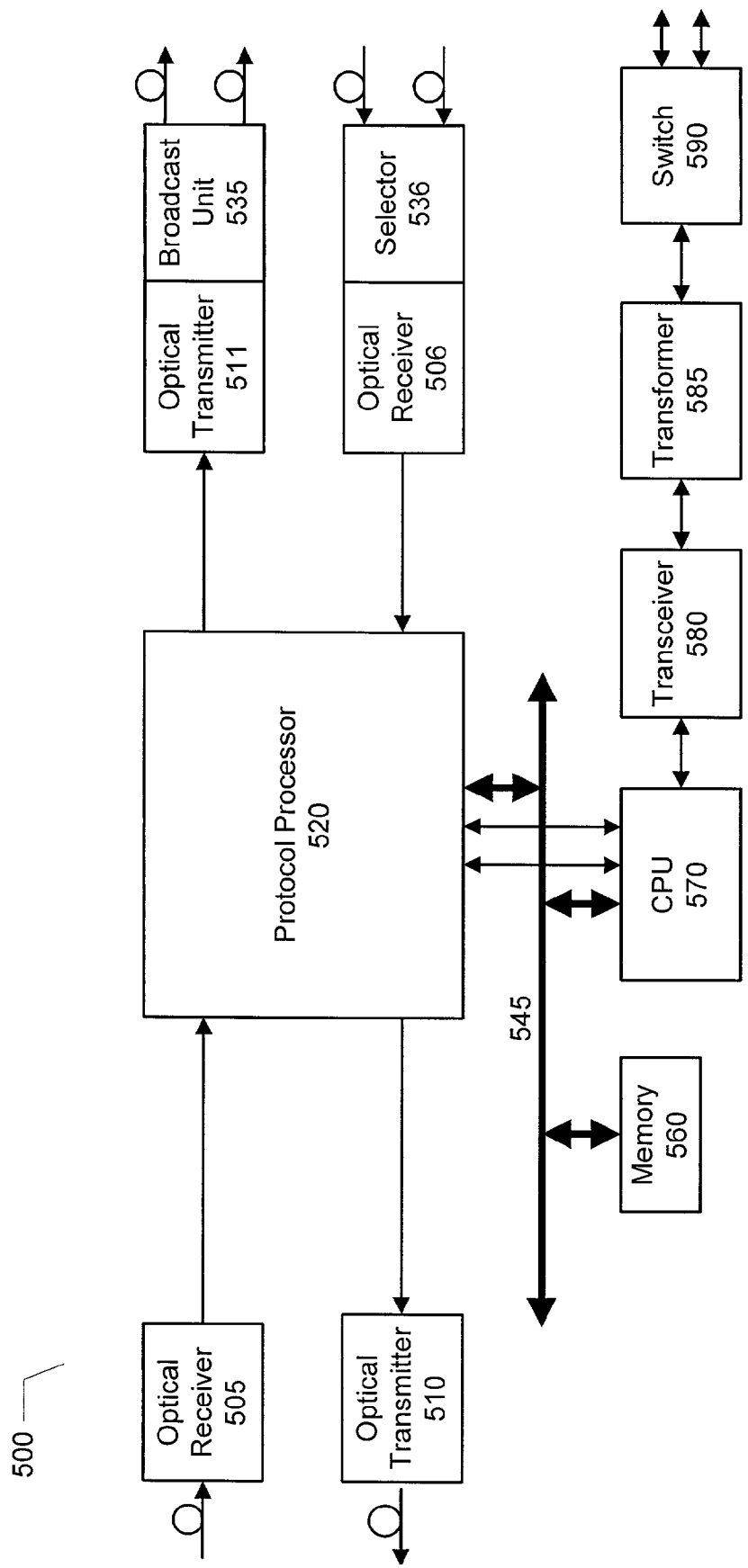
FIG. 5 is a block diagram of the major components of a line card in accordance with an embodiment of the present invention.

Referring now to FIG. 5, the major components of one of line cards 420(1,1)–(N,N), exemplified in FIG. 4 are shown. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 500 receives optical signals from other network elements via a line-side optical receiver 505 and from the local router's system via a system-side optical receiver 506. Each of these receivers implements an optical-to-electrical (O/E) conversion function. Line card 500 transmits optical signals to other network elements using a line-side optical transmitter 510 and to the group matrices using a system-side optical transmitter 511. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 505 is coupled to a protocol processor 520 that performs clock recovery multiplexing, demultiplexing, and SONET STE/LTE processing in both directions. Similarly, system-side optical receiver 506 is also coupled to protocol processor 520 to allow protocol processor 520 to receive optical signals. The processed electrical signals from protocol processor 520 are coupled to the transmitters 510 and 511. The clock recovery functions are combined with demultiplexers and multiplexers to support reception and transmission of the optical data, respectively. The multiplexers serialize output data generated in protocol processor 520 by performing parallel-to-serial conversion on the parallel data. In contrast, de-multiplexers are used in protocol processor 520 to perform serial-to-parallel conversion on received data.

Protocol processor 520 is coupled to a bus 545. Protocol processor 520 interfaces the line card to two copies of the matrix in a 1+1 physical protocol. In a SONET implementation, protocol processor 520 provides both STE/LTE processing according to published industry standards. Also coupled to bus 545 are a memory 560 and a CPU 570. In an exemplary embodiment, memory 560 is fast enough for efficient operation of CPU 570.

CPU 570 communicates with other of line cards 420(1, 1)–(N,N) shown in FIG. 4 over a control bus using a transceiver 580 that is coupled to CPU 570. Transceiver 580, is coupled to a transformer 585 which is coupled to a switch 590. Switch 490 is coupled to a control bus. Switch 590 implements a 1:1 protection scheme for transceiver 580 and couples CPU 570 to two independent ports on a backplane (not shown). Each of the two ports connects to one copy of the hub of the group matrix. This allows the software on the line card to switch to the backup link when the software detects failures on the active link.

In one embodiment, CPU 570 includes numerous integrated peripherals including embedded SCC channels (e.g., in-band communications) and an Ethernet controller (for example, to support communications with other system modules). In one embodiment, CPU 570 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Level-1 Processor/System Controller

A system controller (also referred to herein as a level-1 processor) provides overall control of router 200. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor(s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

SONET Frame

In some networks, network nodes store data which they use for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995) incorporated herein by reference for all purposes and referred to herein as "SONET Specification".

An STS-1 is defined as a specific sequence of 810 bytes (6480 bits) including overhead bytes and an envelope capacity for transporting payloads. An STS-N frame is a sequence of N×810 bytes wherein N is a predetermined number. An STS-N is formed by byte-interleaving of STS-1 and STS-M modules, wherein M is less than N.

Referring to Table 1, a portion of a SONET STS-3c frame, 9 rows and 270 columns, shows the organization of a SONET OC-3c (concatenated) frame, according to the BellCore STS-3c standard for SONET, which is incorporated herein by reference. The frames are transmitted row by row, from top to bottom, column byte by byte, 8000 frames/sec.

TABLE 1

A Sample Portion of a SONET STS-3c Frame

|  |  |  |  |  |  |  |  |  |  |  |  |
|---|---|---|---|---|---|---|---|---|---|---|---|
|  | A1 | A1 | A1 | A2 | A2 | A2 | J0 | Z0 | Z0 | J1 |  |
| SOH | B1 |  |  | E1 |  |  | F1 |  |  | B3 |  |
|  | D1 |  |  | D2 |  |  | D3 |  |  | C2 | Synchronous Payload |
| Point | H1 | H1 | H1 | H2 | H2 | H2 | H3 | H3 | H3 | G1 | Envelope (SPE) |
|  | B2 | B2 | B2 | K1 |  |  | K2 |  |  | F2 |  |
|  | D4 |  |  | D5 |  |  | D6 |  |  | H4 | (9 Bytes × 260 Bytes) |
| LOH | D7 |  |  | D8 |  |  | D9 |  |  | Z3 |  |
|  | D10 |  |  | D11 |  |  | D12 |  |  | Z4 |  |
|  | S1 | Z1 | Z1 | Z2 | Z2 | M1 | E2 |  |  | Z5 |  |

NOTE:
(Section Overhead (SOH) (3 × 9 Bytes), + Pointer (1 × 9 Bytes), + Line Overhead (LOH) (5 × 9 Bytes), + Path Overhead (POH) (9 × 1 Bytes),) = Transport Overhead for OC-3c (STS-3c) Frames. The POH is the 10th Byte in each of the 9 rows (J1, B3, C2, G1, F2, H4, Z3, Z4, Z5).

The OC-3c designation indicates that the carrier is not multiplexed, but carries data from a single source. Thus, the data stream is from a single source at 155.52 Mbps with three OC-1 streams within an OC-3c stream interleaved by column. The interleaving of streams produce a frame 270 columns wide and 9 rows deep. An OC-3c stream produces more actual user data than an OC-3 stream due to the path overhead column being included inside an SPE once instead of three times as is the case for three independent OC-1 streams. Accordingly, as shown in Table 1, 260 of the 270 columns within the frame are available for user data in OC-3c as compared to 258 columns available in OC-3. A similar protocol to OC-3c is provided for European systems in ITU G.783. Although the OC-3 standard is presented, one of ordinary skill in the art with the benefit of the disclosure herein appreciates that the embodiments herein described apply to other SONET and SDH standards.

The first ten bytes of a SONET OC-3c frame constitute transport overhead, followed by 260 bytes of Synchronous Payload Envelope. The ten bytes of transport overhead include section overhead, line overhead and path overhead fields. In general, certain bytes of the transport overhead only travel between each section, and are reconfigured at each section boundary. Other transport overhead field bytes travel through section boundaries and are reconfigured at line boundaries. For example, an Add-Drop Multiplexer (ADM) receiving a SONET frame will interpret the line overhead field bytes. These line overhead field bytes will not be sent on through the network. Instead, the ADM generates new line overhead bytes for transport through the network.

Unlike the line overhead and section overhead bytes, path overhead bytes are received and interpreted at the ends of a path. Accordingly, an ADM receiving a frame will neither remove nor reconfigure path overhead field bytes.

An STS-192 frame provides 192 times as many bytes as an STS-1 frame. An STS-1 frame includes 810 bytes and an STS-192 frame includes 155,520 bytes. Following the SONET Specification, an STS-N path, wherein N represents the type of frame, e.g., STS-3, STS-48 or STS-192 and the like, the overhead includes a J1 field for path trace functions. The specifications for SDH and SONET allow the field to be stuffed with an STS path string of 16 or 64 bytes in SDH and SONET respectively. Typically, the path trace field is used to trace an STS-N signal through the network, often during troubleshooting and maintenance. More specifically, the SONET Specification uses the J1 field to transport a repetitive 64-byte message so that receiving STS path terminating equipment can verify its continued connection to transmitting STS path terminating equipment. The SONET Specification, §6.2.3.2.3 provides that SONET equipment with path terminating equipment allow users to provision, on a per-path basis, the contents of the STS path trace carried in the J1 field of the path overhead. The Specification assumes that a user will provision path terminating equipment to transmit path trace strings that consist of ASCII printable characters '20' through '7E' in hexadecimal notation. Similarly, SDH standards allow a 16-byte identifier using E.164 format. More specifically, SONET equipment allow the contents of the STS path traces to include a string of up to 62 characters with no restriction on the content of the string except that the characters must be ASCII printable characters. Further, the SONET specification requires that network equipment automatically pad the string entered by the user to 64 characters using ASCII NULL characters ('00').

Figure 6:
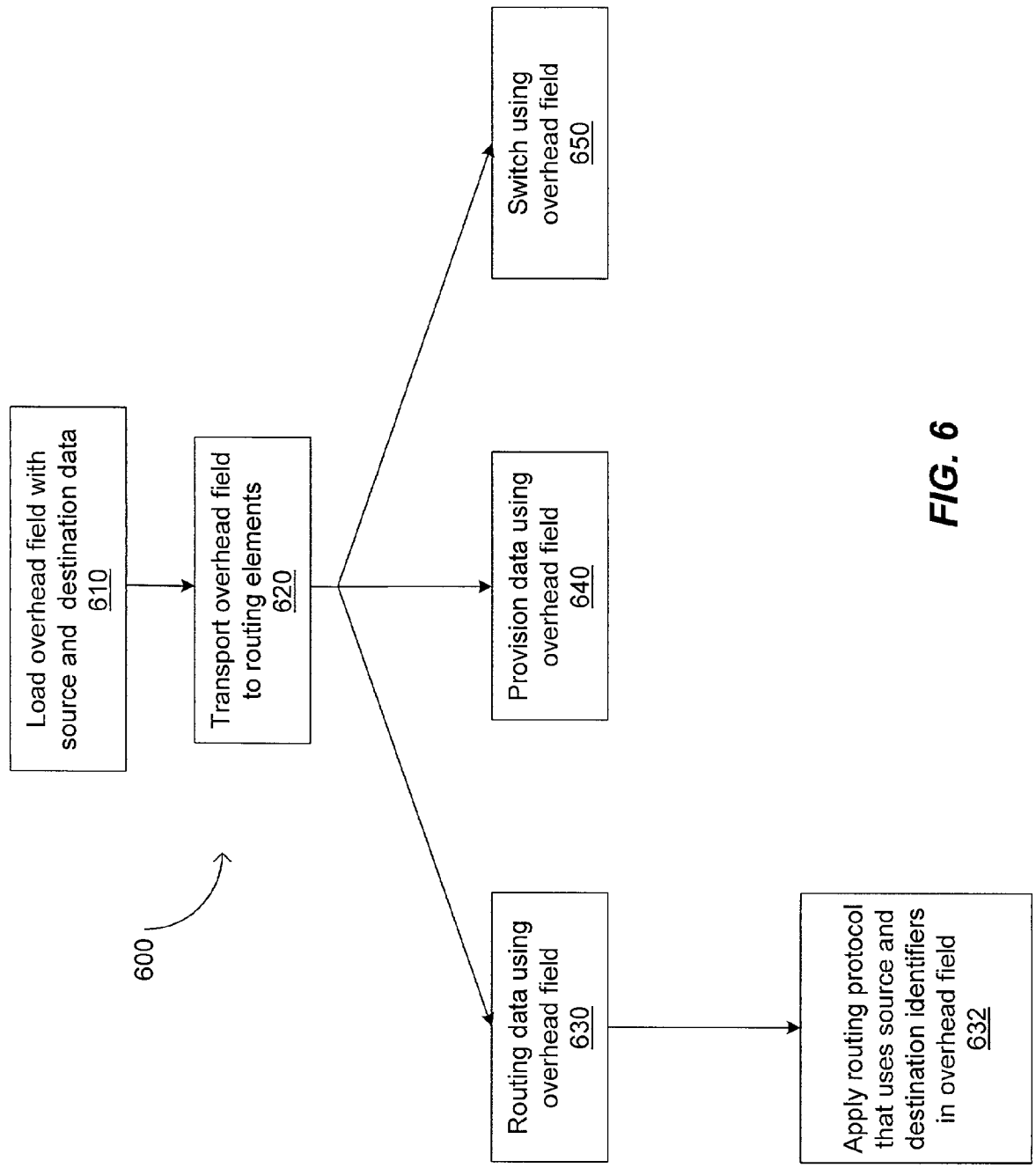
FIG. 6 is a flow diagram of a method in accordance with an embodiment of the present invention.

Referring to FIG. 6, a diagram 600 illustrates a method according to an embodiment of the invention in which the J1 field, or other appropriate overhead field such as a path trace field, contains source and destination data. In one embodiment, for example, a J0 field, or section trace field is appropriate. In the J0 field embodiment, section-level provisioning is performed. Referring to block 610, the J1 field is loaded with source and destination data for a communication packet. More specifically, in an embodiment the J1 field includes one or more of Internet Protocol (IP) addresses of the source and destination, transport identification (TID) data, and CLLI (Common Language Location Information) data.

Block 620 provides that the J1 field is transported to routing elements in a communications network. Blocks 630, 640 and 650 provide for performing at least one of traffic routing 630, provisioning 640 and switching 650 functions using the data held in the J1 field. Thus, the J1 field data as depicted in accordance with the present invention, extends the usefulness of the J1 field beyond network operations such as those cited in the SONET Specification. For example, including source and destination data permits network operators to avoid manual point-by-point routing of STS-Ns. Instead, operators using a system in accordance with an embodiment of the invention use the J1 field to create new paths for services and provide end-to-end path routing and provisioning. Thus, the J1 field is user defined in an exemplary embodiment.

For example, block 630, in one embodiment, includes using an intelligent routing protocol to read the source and destination data in the J1 field to perform routing, provisioning and restoration of functions at the path level. In SONET terms, the path level is referred to as an STS-1 level.

Block 632 provides for applying a routing protocol to the source and destination identifiers to provide services at the STS-1 level. The routing protocol can be applied either automatically or manually by a user. For example, an intelligent routing software system in combination with a routing protocol can determine end-to-end routing automatically. One system appropriate for an embodiment that provides end-to-end routing using the source and destination identifiers in the J1 field includes the routing protocol disclosed in U.S. patent application entitled: "A Method for Routing Information Over a Network," with inventors Zareh Baghdasarian, Vahid Parsi, Ali Saleh, Ali, and Michael H. Zadikian, Ser. No. 09/232,397, filed on Jan. 15, 1999, incorporated herein in its entirety and for all purposes. More specifically, using the overhead field such as the J1 field with a wavelength routing protocol described in the above-described patent application extends the protocol to an STS-1 level. Other routing protocols that are appropriate for SONET/SDH applications can further apply the method described above to extend routing to an STS-1 level. For example, in one embodiment, the overhead field includes source and destination identifiers as well as data identifying requests for bandwidth. Thus, the J1 field is used to perform a plurality of functions by communicating at an STS-1 level.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for a data communications system, the method comprising:
    transmitting data in a transport overhead field to at least one network element, the data providing a source identifier and a destination identifier; and
    processing the data in the transport overhead field to provide virtual path end-to-end services, wherein said processing is performed by a route processor.

2. The method of claim 1 wherein the transport overhead field is a J1 field in a SONET communication packet.

3. The method of claim 2 wherein the J1 field includes the source identifier and the destination identifier.

4. The method of claim 1 further comprising:
    applying a routing protocol to read the source identifier and the destination identifier.

5. The method of claim 1 wherein the virtual path end-to-end services include one or more of routing, provisioning and restoration of functions.

6. The method of claim 1 wherein the virtual path end-to-end services are path-level services of a SONET communications network.

7. The method of claim 1 wherein the method is performed in a communication circuit disposed in one of a synchronous optical network (SONET) and a Synchronous Digital Hierarchy (SDH).

8. The method of claim 1 wherein the data further includes one or more of
    transport identification data (TID),
    Internet Protocol (IP) addresses,
    Common Language Location Information (CLLI) data, and
    requests for bandwidth.

9. The method of claim 1 wherein the data providing the source identifier and the destination identifier avoid manual point-by-point routing of STS-Ns.

10. The method of claim 1 further comprising:
applying a wavelength routing protocol to the data in the transport overhead field to provide end-to-end services, the wavelength protocol locating new paths for communication.

11. The method of claim 10 wherein an intelligent routing software system in combination with the wavelength routing protocol determines end-to-end routing automatically.

12. The method of claim 10 wherein the wavelength protocol locating new paths for communication is implemented manually.

13. The method of claim 1 wherein said processing comprises:
interpreting a failure indication from a network element in a failed virtual path;
calculating a new virtual path to replace the failed virtual path; and
providing an indication of the new virtual path to an affected network element.

14. The method of claim 1 wherein said processing comprises:
calculating a virtual path from a network element corresponding to the source identifier to a network element corresponding to the destination identifier.

15. An apparatus disposed in a communication system, the apparatus comprising:
means for transmitting data in a transport overhead field to at least one network element, the data providing a source identifier and a destination identifier; and
a route processor means for processing the data in the transport overhead field to provide virtual path end-to-end services.

16. The apparatus of claim 15 wherein the transport overhead field is a J1 field in a SONET communication packet.

17. The apparatus of claim 16 wherein the J1 field includes the source identifier and the destination identifier.

18. The apparatus of claim 15 further comprising:
means for applying a routing protocol to read the source identifier and the destination identifier.

19. The apparatus of claim 15 wherein the virtual path end-to-end services include one or more of routing, provisioning and restoration of functions.

20. The apparatus of claim 15 wherein the virtual path end-to-end services are path-level services of a SONET communications network.

21. The apparatus of claim 15 wherein the apparatus includes a communication circuit disposed in one of a synchronous optical network (SONET) and a Synchronous Digital Hierarchy (SDH).

22. The apparatus of claim 15 wherein the data further includes one or more of
transport identification data (TID),
Internet Protocol (IP) addresses,
Common Language Location Information (CLLI) data, and
requests for bandwidth.

23. The apparatus of claim 15 wherein the data providing the source identifier and the destination identifier avoids manual point-by-point routing of STS-Ns.

24. The apparatus of claim 15 further comprising:
means for applying a wavelength routing protocol to the data in the transport overhead field to provide end-to-end services, the wavelength protocol locating new paths for communication.

25. The apparatus of claim 24 wherein an intelligent routing software system in combination with the wavelength routing protocol determines end-to-end routing automatically.

26. The apparatus of claim 24 wherein the wavelength protocol locates new paths for communication manually.

27. The method of claim 15 wherein said means for processing comprises:
means for interpreting a failure indication from a network element in a failed virtual path;
means for calculating a new virtual path to replace the failed virtual path; and
means for providing an indication of the new virtual path to an affected network element.

28. The method of claim 15 wherein said means for processing comprises:
means for calculating a virtual path from a network element corresponding to the source identifier to a network element corresponding to the destination identifier.

29. A computer program product for communication, the computer program product comprising:
a first set of instructions, executable on a processor, configured to transmit data in a transport overhead field to at least one network element, the data providing a source identifier and a destination identifier; and
a second set of instructions, executable on a router processor, configured to use the data in the transport overhead field to provide virtual path end-to-end services.

30. A method for a data communications system, the method comprising:
receiving data in a transport overhead field by at least one network element, the data providing a source identifier and a destination identifier; and
processing the data in the transport overhead field to provide virtual path end-to-end services, wherein said processing is performed by a route processor.

31. The method of claim 30 wherein the transport overhead field is a J1 field in a SONET communication packet.

32. The method of claim 31 wherein the J1 field includes the source identifier and the destination identifier.

33. The method of claim 30 further comprising:
applying a routing protocol to read the source identifier and the destination identifier.

34. The method of claim 30 wherein the virtual path end-to-end services include one or more of routing, provisioning and restoration of functions.

35. The method of claim 30 wherein the virtual path end-to-end services are path-level services of a SONET communications network.

36. The method of claim 30 wherein
the method is performed in a communication circuit disposed in one of a synchronous optical network (SONET) and a Synchronous Digital Hierarchy (SDH).

37. The method of claim 30 wherein the data further includes one or more of
transport identification data (TID),
Internet Protocol (IP) addresses,
Common Language Location Information (CLLI) data, and
requests for bandwidth.

38. The method of claim 30 wherein the data providing the source identifier and the destination identifier avoid manual point-by-point routing of STS-Ns.

39. The method of claim 30 further comprising:
applying a wavelength routing protocol to the data in the transport overhead field to provide end-to-end services, the wavelength protocol locating new paths for communication.

40. The method of claim 39 wherein an intelligent routing software system in combination with the wavelength routing protocol determines end-to-end routing automatically.

41. The method of claim 39 wherein the wavelength protocol locating new paths for communication is implemented manually.

42. The method of claim 30 wherein said processing comprises:
interpreting a failure indication from a network element in a failed virtual path;
calculating a new virtual path to replace the failed virtual path; and
providing an indication of the new virtual path to an affected network element.

43. The method of claim 30 wherein said processing comprises:
calculating a virtual path from a network element corresponding to the source identifier to a network element corresponding to the destination identifier.

44. An apparatus disposed in a communication system, the apparatus comprising:
a receiver network element configured to receive data in a transport overhead field from at least one transmitting network element,
the data providing a source identifier and a destination identifier; and
a route processor configured to process the data in the transport overhead field to provide virtual path end-to-end services.

45. The apparatus of claim 44 wherein the transport overhead field is a J1 field in a SONET communication packet.

46. The apparatus of claim 45 wherein the J1 field includes the source identifier and the destination identifier.

47. The apparatus of claim 44 wherein the receiver applies a routing protocol to read the source identifier and the destination identifier.

48. The apparatus of claim 44 wherein the virtual path end-to-end services include one or more of
routing,
provisioning, and
restoration of functions.

49. The apparatus of claim 44 wherein the virtual path end-to-end services are path-level services of a SONET communications network.

50. The apparatus of claim 44 wherein the data further includes one or more of
transport identification data (TID),
Internet Protocol (IP) addresses,
Common Language Location Information (CLLI) data, and
requests for bandwidth.

51. The apparatus of claim 44 wherein the data providing the source identifier and the destination identifier avoids manual point-by-point routing of STS-Ns.

52. The apparatus of claim 44 further comprising:
means for applying a wavelength routing protocol to the data in the transport overhead field to provide end-to-end services,
the wavelength protocol locating new paths for communication.

53. The apparatus of claim 52 wherein
an intelligent routing software system in combination with the wavelength routing protocol determines end-to-end routing automatically.

54. The apparatus of claim 52 wherein the wavelength protocol locates new paths for communication manually.

55. The apparatus of claim 44 wherein the route processor is further configured to:
interpret a failure indication from a network element in a failed virtual path;
calculate a new virtual path to replace the failed virtual path; and
provide an indication of the new virtual path to an affected network element.

56. The apparatus of claim 44 wherein the route processor is further configured to:
calculate a virtual path from a network element corresponding to the source identifier to a network element corresponding to the destination identifier.

* * * * *